(12) United States Patent
Wu et al.

(10) Patent No.: US 10,609,390 B1
(45) Date of Patent: Mar. 31, 2020

(54) ADAPTIVE SCREEN ENCODING CONTROL

(71) Applicants: Jing Wu, Hangzhou (CN); Zhaofeng Jia, Hefei (CN); Bo Ling, Hangzhou (CN); Qiyong Liu, Hangzhou (CN)

(72) Inventors: Jing Wu, Hangzhou (CN); Zhaofeng Jia, Hefei (CN); Bo Ling, Hangzhou (CN); Qiyong Liu, Hangzhou (CN)

(73) Assignee: Zoom Video Communications, Inc., San Jose, CA (US)

( * ) Notice: Subject to any disclaimer, the term of this patent is extended or adjusted under 35 U.S.C. 154(b) by 24 days.

(21) Appl. No.: 15/986,655

(22) Filed: May 22, 2018

Related U.S. Application Data

(63) Continuation of application No. 14/462,908, filed on Aug. 19, 2014.

(60) Provisional application No. 61/867,558, filed on Aug. 19, 2013.

(51) Int. Cl.
*H04N 19/177* (2014.01)
*H04N 19/172* (2014.01)
*H04N 19/179* (2014.01)
*H04N 7/15* (2006.01)
*H04N 19/136* (2014.01)

(52) U.S. Cl.
CPC ............. *H04N 19/177* (2014.11); *H04N 7/15* (2013.01); *H04N 19/136* (2014.11); *H04N 19/172* (2014.11); *H04N 19/179* (2014.11)

(58) Field of Classification Search
USPC ............................................. 348/14.01–14.16
See application file for complete search history.

(56) References Cited

U.S. PATENT DOCUMENTS

| | | | |
|---|---|---|---|
| 6,169,573 B1* | 1/2001 | Sampath-Kumar | G06F 17/30017 348/169 |
| 2005/0094732 A1* | 5/2005 | Mukherjee | H04N 7/17318 375/240.25 |
| 2005/0099869 A1* | 5/2005 | Crinon | H04N 19/70 365/222 |
| 2007/0064809 A1* | 3/2007 | Watanabe | H04N 19/159 375/240.16 |
| 2007/0201500 A1* | 8/2007 | Deshpande | H04L 47/10 370/412 |

* cited by examiner

*Primary Examiner* — Hemant S Patel
(74) *Attorney, Agent, or Firm* — JW Law Group; James M. Wu

(57) ABSTRACT

An adaptive screen encoding method comprising: using a computer, creating and storing, in computer memory, a plurality of conditions for use by a server configured to determine which of picture coding type to select; detecting a current picture by a sender for a content type including textual content, graphical content, and natural image content; determining a percentage of static macroblocks corresponding to the current picture; selecting the picture coding type based on the content type, the plurality of conditions, and the percentage of static macroblocks, wherein the method is performed by one or more special-purpose computing devices.

8 Claims, 8 Drawing Sheets

ADAPTIVE SCREEN ENCODING CONTROL

PRIORITY

This patent application is a continuation of U.S. patent application Ser. No. 14/462,908, filed Aug. 19, 2014, in the name of the same inventors(s) and having a title of "Adaptive Screen Encoding Control," which further claims the benefit of priority based upon U.S. Provisional Patent Application Ser. No. 61/867,558, filed on Aug. 19, 2013 in the name of the same inventor(s) and having a title of "Method and Apparatus for Providing Video Communication," hereby incorporated into the present application by reference.

FIELD OF THE DISCLOSURE

The present disclosure generally relates to screen encoding. The disclosure relates more specifically to adaptive screen encoding.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Video conferencing allows people to communicate with each other in remote locations through audio and video media in real time. There are limitations in the quality of the video and audio communication streams between participants of video conferencing which are mostly due to bandwidth constraints between the participants.

SUMMARY

The appended claims may serve as a summary of the invention.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described in sections below according to the following outline:
1. Overview
2. Adaptive Bit Rate
3. Temporal Sub-Layer Switching
4. Random Access
5. Content Analysis
6. Reference Selection and Coding Type Decision
7. Example Implementation Mechanism—Hardware Overview

1. OVERVIEW

While screen sharing during a video conferencing session, the content of captured screen video sequence, which usually contains text, graphic, and natural image, and the operation of mouse on the screen brings a significant difference between the screen video sequences and traditional natural image sequence of a video stream. To handle the screen video's features and provide a high quality visual experience, an adaptive encoding control strategy based on the screen video content characteristics is utilized to support features: 1) adaptive bitrates control; 2) temporal sub-layer switching; and 3) random access.

Further to handle the screen video's features and provide a high quality visual experience, a multiple reference picture selection strategy based on the screen video content characteristics is proposed which includes: 1) content analysis; and 2) reference selection and the coding type decision.

Figure 1:
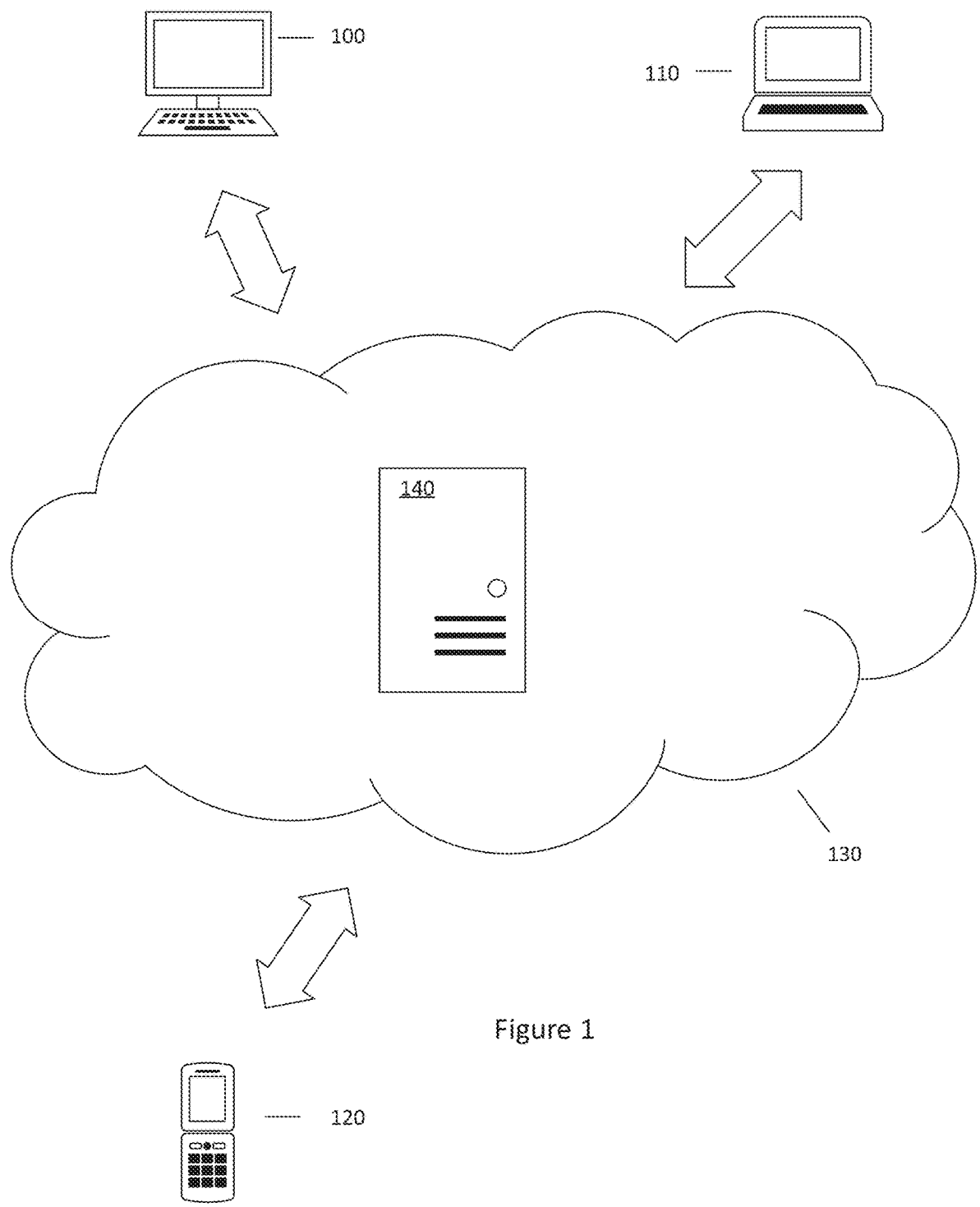
FIG. 1 illustrates a networked computer system with which an embodiment may be implemented.

FIG. 1 illustrates a networked computer system with which an embodiment may be implemented. In one approach, a server computer 140 is coupled to a network 130, which is also coupled to client computers 100, 110, 120. For purposes of illustrating a clear example, FIG. 1 shows a limited number of elements, but in practical embodiments there may be any number of certain elements shown in FIG. 1. For example, the server 102 may represent an instance among a large plurality of instances of the application server in a data center, cloud computing environment, or other mass computing environment. There also may include thousands or millions of client computers.

In an embodiment, the server computer 140 hosts a video conferencing meeting and transmits and receives video, image, and audio data to and from each of the client computers 100, 110, 120.

Each of the client computers 100, 110, 120 comprises a computing device having a central processing unit (CPU), graphics processing unit (GPU), one or more buses, memory organized as volatile and/or nonvolatile storage, one or more data input devices, I/O interfaces and output devices such as loudspeakers or a LINE-OUT jack and associated drivers. Each of the client computers 100, 110, 120 may include an integrated or separate display unit such as a computer screen, TV screen or other display. Client computers 100, 110, 120 may comprise any of mobile or stationary computers including desktop computers, laptops, netbooks, ultrabooks, tablet computers, smartphones, etc. Typically the GPU and CPU each manage separate hardware memory spaces. For example, CPU memory may be used primarily for storing program instructions and data associated with application programs, whereas GPU memory may have a high-speed bus connection to the GPU and may be directly mapped to row/column drivers or driver circuits associated with a liquid crystal display (LCD) that serves as the display. In one embodiment, the network 130 is the Internet.

Each of the client computers 100, 110, 120 hosts, in an embodiment, an application that allows each of the client computers 100, 110, 120 to communicate with the server computer 140. In an embodiment, the server 140 may maintain a plurality of accounts, each associated with one of the client computers 100, 110, 120 and/or one or more users of the client computers.

Figure 2:
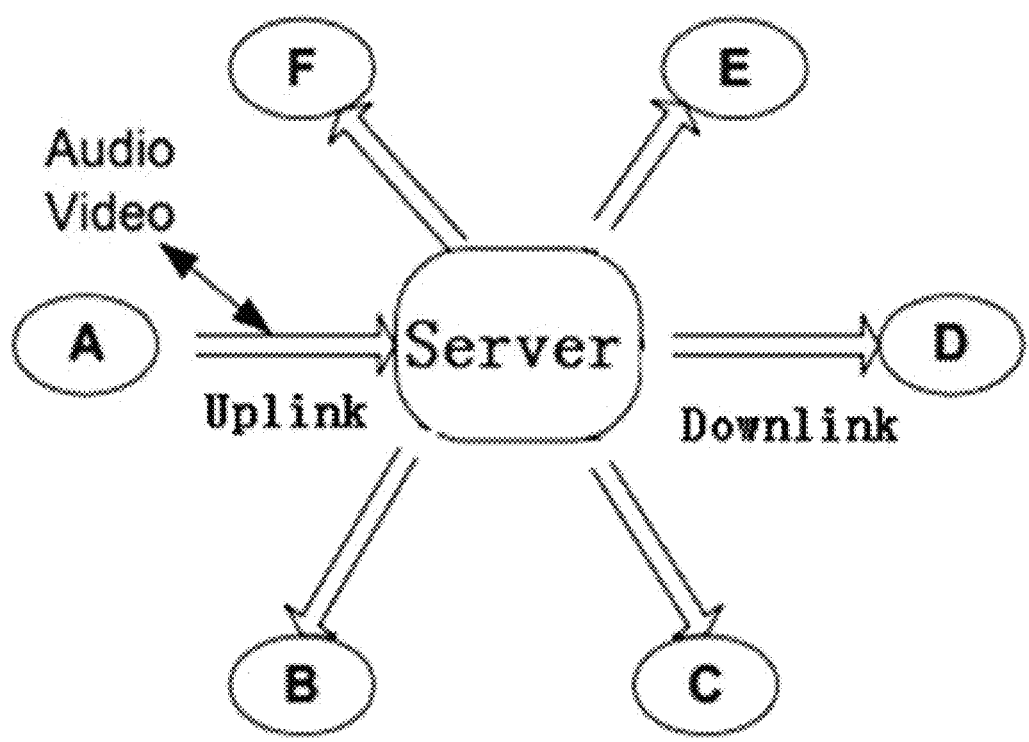
FIG. 2 illustrates a block diagram according to an embodiment.

Typically video conferencing meetings utilize a client-server architecture, illustrated in FIG. 2, where clients A, B, C, D, E, F are a conferencing endpoint/meeting attendee and the Server is an MCU (Multipoint Control Unit) or a meeting server. An audio/video stream is sent from one of the clients A, B, C, D, E, F through an Uplink connection to the Server and further distributed to other clients through various Downlink connections. The uplink bandwidth of a client limits the overall bitrate of the audio/video stream produced by the sending client, thus affecting the audio/video quality of all receiving clients. The bandwidth of a particular downlink connection limits the maximal bitrate consumption by the corresponding receiving client. In this embodiment as shown in FIG. 2, the Uplink connection is through client A and the Downlink connection is through client D.

When there are only two clients, the architecture may be reduced to a peer-to-peer architecture by eliminating the server. In this case the uplink connection of a client is the same as the downlink connection of the other.

2. ADAPTIVE BIT RATE

In one embodiment, in the screen video sequence, the motion between two consecutive pictures is caused by the mouse operation on the screen, which is discontinuous and irregular. In one embodiment, a scene change is introduced by the switching operation between the documents on the screen. In other embodiment, the scene is static with a period of time for the document analysis. Due to this specific motion characteristic, the bitrates of the encoded screen video sequence is also irregular and hard to control. The traditional constant bit rate (CBR) control is unpractical in the screen video transform system.

To control the bitrates of the encoded screen video sequence and satisfy the various requirements of different receive channels, the following reference rules are adopted in the screen video encoder:

I) The long term reference picture is used to record the different scene contents.

II) The multiple reference pictures are used to provide more scenes information in the screen video encoding.

III) The picture marked as a short term reference (STR) can refers to both the long term reference (LTR) pictures and the short term reference pictures. But the picture marked as a long term reference can only refers to the long term reference pictures.

IV) When the picture marked as a long term reference is encoded, all the short term reference pictures that precede the current picture in decoding order are marked as "unused for reference" and removed from the reference list.

Figure 3:
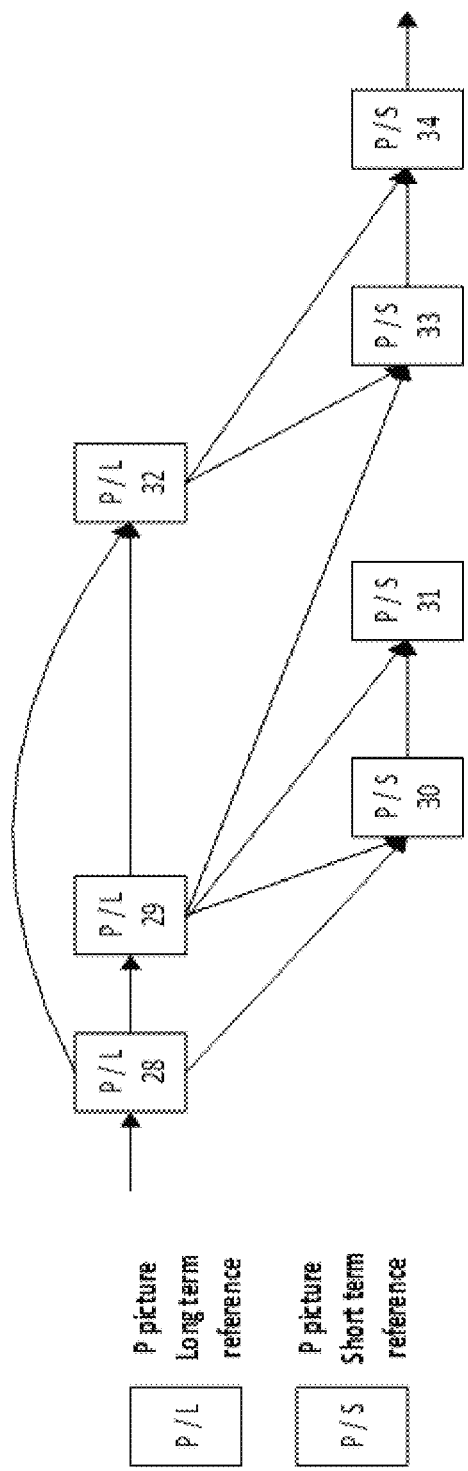
FIG. 3 illustrates a frame sequencing according to an embodiment.

FIG. 3 illustrates a typical multiple reference structure. For each picture encoding, two reference pictures in the reference picture list are referred. The pictures $P_{28}$, $P_{29}$, $P_{32}$ are encoded as the long term reference picture, which refer to the long term reference picture. The pictures $P_{30}$, $P_{31}$, $P_{33}$, and $P_{34}$ are encoded as the short term reference picture, which can refer to both the long term reference picture and the short term reference picture. In one embodiment, $P_{29}$ is a long term reference picture; $P_{30}$ and $P_{31}$ are the short term reference pictures preceding $P_{29}$ in decoding order; $P_{33}$ and $P_{34}$ are the short term reference pictures following $P_{29}$ in decoding order. Based on Rule IV, when $P_{33}$ is encoded, $P_{30}$ and $P_{31}$ are removed from the reference picture list and are not used as the reference picture. So $P_{33}$ refers to the long term reference pictures $P_{29}$ and $P_{32}$.

Rule I and Rule II are designed to increase the compression efficiency and reduce the probability of an instantaneous decoding refresh (IDR) picture encoding. The bitrates of IDR picture with only intra prediction is larger than the P picture with both inter and intra predictions. So when an IDR picture is generated, a burst of transform data will happen in the video channel. The larger video size is, the larger data burst occurs. In video conferencing applications, the size of screen video is usually larger than normal camera captured video or movies, and the content of screen video, including text, graphic, and natural image, is also more complex for the compression. Therefore, the bitrates of an IDR picture is typically higher and a larger data burst will be brought to the screen video transform system. Based on Rule I and Rule II, it is effective to avoid IDR picture encoding when the switching operation is performed between the documents on the screen.

Though Rule I and Rule II effectively decrease the bitrates of the encoded screen video sequence, it is still need to control the bitrates to the different screen video channels with various receive capability. Rule III and Rule IV are put forward for the sending control on the server.

On the server, a sender buffer is built to store all the encoded picture data sent from the screen video encoder client, and some sending lists are set up to control the sending bit stream of the screen video receiving channels. One sending list is adjusted to the network condition of one screen video receiving channel. The network condition is estimated by the residence time (RT) of each picture in the sending list. The larger the residence time is, the lower the bandwidth is available in the corresponding screen video receiving channel.

When a new picture data arrives to the server, it is added first into all the sending lists and its residence time is separately traced in each sending list. Then each sending list is updated. According to the residence time of the pictures in the sending list, the following adjustment is operated.

Step 1: If one picture in the sending list is marked as a long term reference picture and its residence time is larger than a predefined threshold $RT_{short}$, based on Rule III and Rule IV, all the short term reference pictures preceding the current long term reference picture in decoding order are removed from the sending list and not sent to the correspond screen video receiving channel. The other pictures following the current long term reference picture in decoding order still can be successfully decoded. By utilizing Step 1, it can eliminate the network congestion and have no influence on the screen video encoder and other screen video receiving channels.

Step 2: If the residence time of one picture in the sending list is larger than another predefined threshold $RT_{long}$ ($RT_{long}$>$RT_{short}$), this picture is marked as a requested picture and a key picture request with this picture info is sent to the screen video encoder client. In the screen video encoder, according to the key picture request, a synchronous P picture is encoded and sent to the server. The synchronous P picture is marked as a long term reference picture and only refers to the long term reference pictures preceding the requested picture in decoding order. When the correspond sending list receive the synchronous P picture, the pictures following the request picture and preceding the synchronous P picture in decoding order are removed from the sending list and not sent to the correspond screen video receiving channel.

Figure 4:
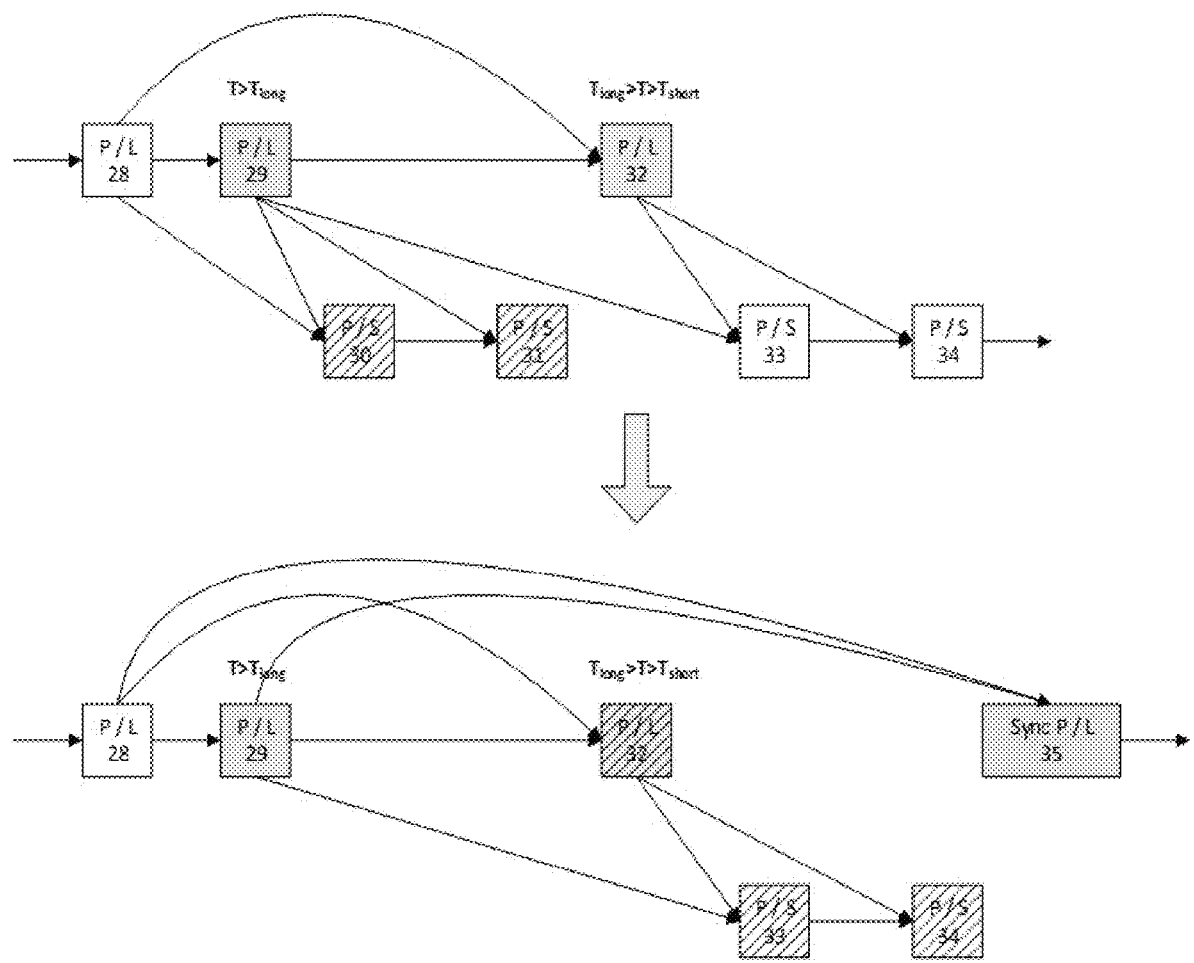
FIG. 4 illustrates a frame sequencing according to an embodiment.

An example of the sending control in one sending list is shown in FIG. 4. When the picture $P_{34}$ arrives to the server, it is added first into the sending list. Then, the residence time of each picture in the sending list is inspected. For the residence time of the picture $P_{32}$ is longer than $RT_{short}$, the short term reference pictures $P_{30}$ and $P_{31}$ preceding $P_{32}$ in decoding order are removed from the sending list. Because of the residence time of the picture $P_{29}$ is longer than $RT_{long}$, the picture $P_{29}$ is marked as a requested picture and a key picture request is sent to the encoder. At this moment, the sending list includes the pictures $P_{28}$, $P_{29}$, $P_{32}$, $P_{33}$, and $P_{34}$. The next picture $P_{35}$ is a synchronous P picture, which is only referred to the long term reference picture preceding or equal to the requested picture $P_{29}$ in decoding order. Therefore, when the synchronous picture $P_{35}$ arrive to the server, the sending list is updated. All the pictures $P_{28}$, $P_{29}$, $P_{32}$, and $P_{33}$, which is following the requested picture $P_{29}$ and preceding the synchronous picture $P_{35}$ in decoding order, are removed from the sending list to eliminate the network congestion and have no influence on the following picture decoding. Finally, only the picture $P_{28}$, $P_{29}$, and $P_{35}$ is included in the sending list.

3. TEMPORAL SUB-LAYER SWITCHING

The capability of the screen video receive channel is influenced by the client requirement and capability, the network condition, etc. As described, the bitrates can be adaptive to the different network condition by the sending control on the server. However, if the capabilities of the screen video receive channels are sufficiently different, the key picture request will be frequently sent to the screen video encoder, for which the benefit of the long term reference in the screen video encoding will be greatly reduced. To avoid the frequent key picture requests, the temporal scalable encoding structure is adopted to provide more scalable adaptive bitrates control.

According to the client requirement and capability, the different frame rates are setting to the screen video encoder. An exemplary case is shown in Table 1. To realize the multiple frame rates setting, N temporal layer structure is used and each temporal layer has its own frame rate.

TABLE 1

The frame rate requirement in the different platform

| Platform | Frame rate |
| --- | --- |
| PC | 25 |
| Mobile device, such as iPad | 5 |

In the temporal scalable structure N, the reference rules are adjusted as follow:

I) In each temporal layer, a corresponding long term reference list and a corresponding short term reference list are managed.

II) The picture marked as a short term reference (STR) with temporal layer id $T_x$ can refers to both the long term reference (LTR) pictures and the short term reference pictures with temporal layer id $T_i$ (i<=x). But the picture marked as a long term reference (LTR) with temporal layer id $T_x$, can only refers to the long term reference pictures with temporal layer id $T_i$ (i<=x).

III) When the picture marked as a long term reference with temporal layer id $T_x$ is encoded, all the short term reference pictures precede the current picture in decoding order are marked as "unused for reference" and removed from the reference list.

By this adjustment, a temporal layer $T_{Subscribed}$ is first subscribed by the screen video channel based on its client requirement and capability. Then the temporal layer switching and the adaptive bitrates control are combined to adjust bitrates to the network condition variation.

When the new picture with temporal layer id $T_x$ arrives to the server, the temporal layer switching in each sending list is first applied.

In one sending list, if the residence time of one long term reference picture is larger than $T_{long}$ and the sending temporal layer $T_{Sending}$ ($T_{Sending} \leq T_{Subscribed}$) is higher than $T_0$, the bad network condition is estimated and the temporal down-switching is performed. The sending temporal layer $T_{Sending}$ is degraded ($T_{Sending}$--), and all the pictures with temporal layer id higher than $T_{Sending}$ are removed from the sending list.

In another case, if all the residence time of pictures in the period P is smaller than a predefined threshold $RT_{fast}$ ($RT_{short} > RT_{fast}$) and the sending temporal layer $T_{Sending}$ is lower than $T_{Subscribed}$, the good network condition is estimated and the temporal up-switching is performed. The sending temporal layer $T_{Sending}$ is upgraded ($T_{Sending}$++), and a key picture request is sent to the encoder. When the synchronous P picture with temporal layer id $T_{Sending}$ arrives, the temporal up-switching is finished. All the pictures with temporal layer id lower than $T_{Sending}$ and following the synchronous P picture in decoding order can be successfully decoding.

After the temporal layer switching, the new picture with temporal layer id $T_x$ is added to the corresponding sending list with temporal layer $T_{Sending}$ ($T_x \leq T_{Sending}$). Then, the sending list updating is respectively performed. If the sending temporal layer $T_{Sending}$ is higher than $T_0$, and the residence time of one long term reference picture is larger than $RT_{short}$, all the short term reference pictures preceding the current long term reference picture in decoding order are removed from the sending list. If the sending temporal layer $T_{Sending}$ is equal to $T_0$, the adaptive bitrates control is applied.

Figure 5:
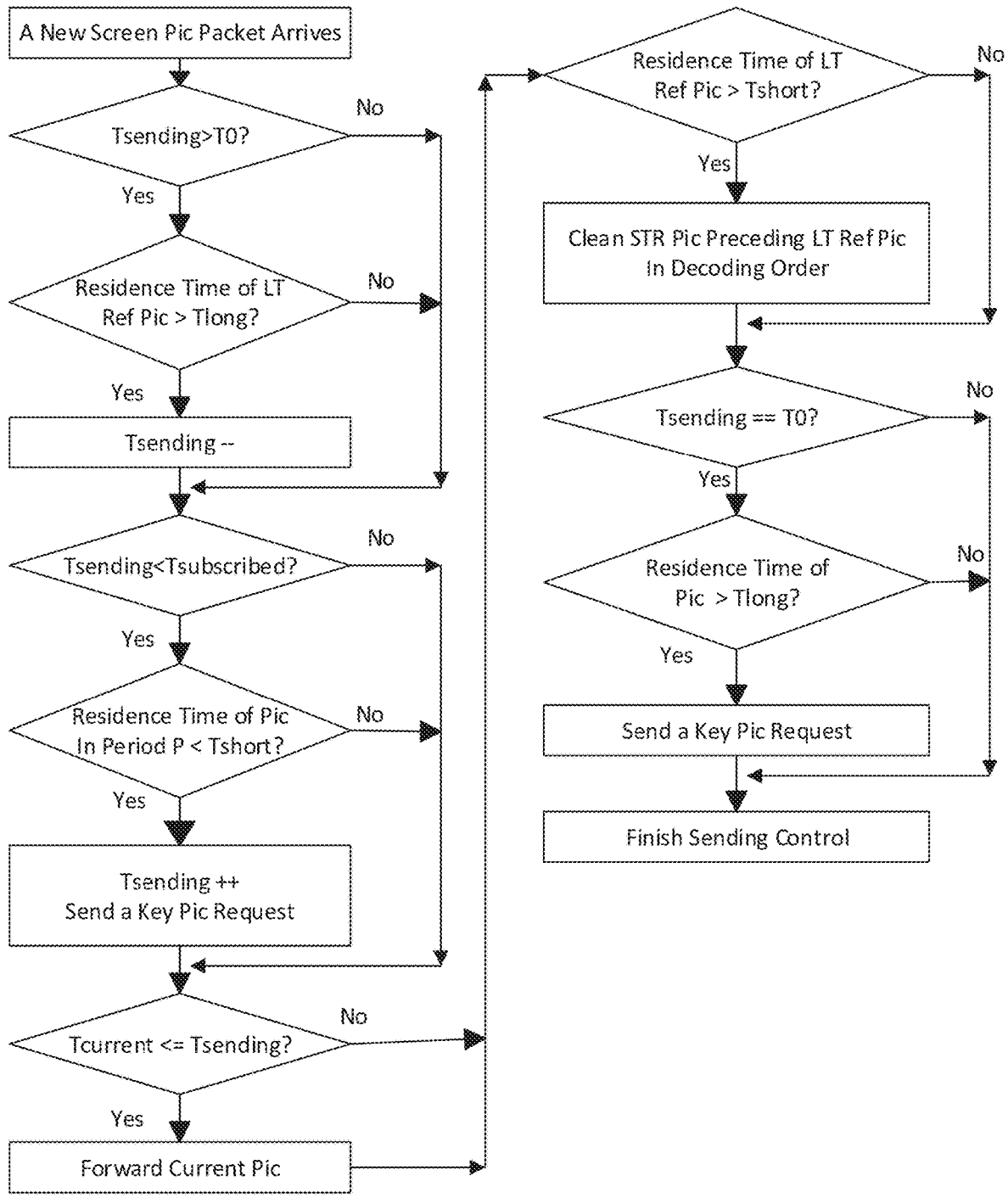
FIG. 5 illustrates a flow diagram according to an embodiment.

FIG. 5 shows a flow chart which illustrates whether the sending temporal layer $T_{Sending}$ is degraded or upgraded, the current picture is forwarded, removing the STR picture preceding the LTR picture in decoding order, and sending a key picture request.

4. RANDOM ACCESS

In many real-time video applications, random access is an important feature for users to be able to switch between different channels.

In some embodiments, an instantaneous decoding refresh (IDR) picture with only intra prediction is used for random access. When a new attendee joins one video channel, the new attendee and all old existing attendees in the same video channel will receive an IDR picture simultaneously. Through the IDR picture, the synchronization between the new attendee and other old existing attendees in this video channel is accomplished, and the new attendee can successfully receive and decode the following video data of this video channel. However, there is a drawback of IDR picture in the screen video transform system, which is described previously. In one embodiment to avoid the data burst caused by IDR picture, the IDR picture is replaced by encoding in a random access point of the new attendee.

First, I picture is encoded to record the new scene in the screen video. Then, the newest successfully sent I picture with temporal layer id $T_0$ is stored in the server of the screen video system. When a new attendee joins, the encoder removes all the reference pictures excluding the server stored I picture and encodes a synchronous P picture which only refers to the server stored I picture. For the screen video receiving channel of the new attendee, both the server stored I picture and the synchronous P picture is sent by the server. For the other existing screen video receiving channels, only the synchronous P picture is needed. Accordingly, the influence of the new attendee is greatly reduced.

Figure 6:
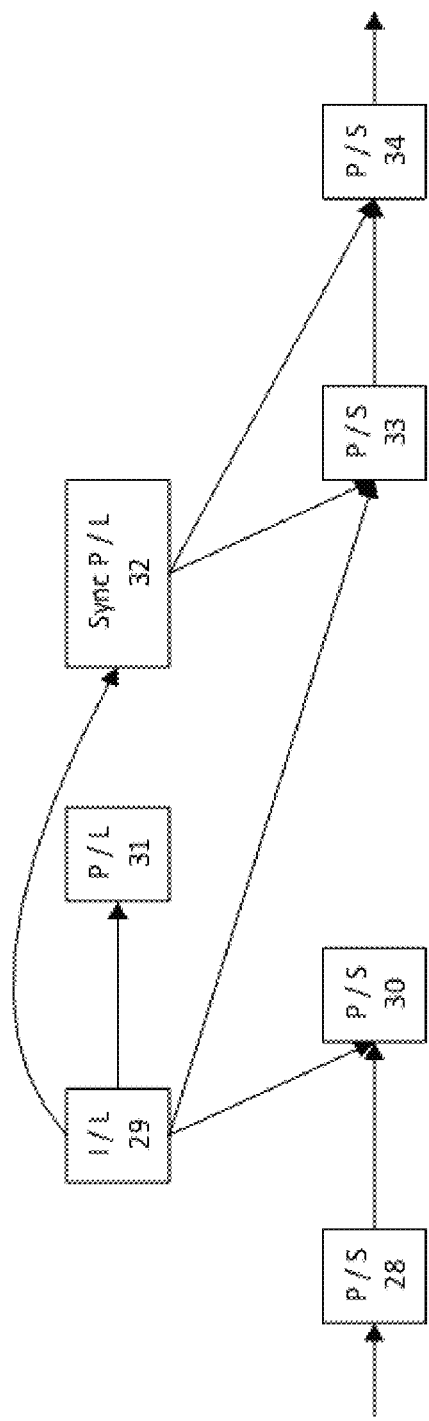
FIG. 6 illustrates a frame sequencing according to an embodiment.

A typical prediction structure around a synchronous P picture is shown in FIG. 6. The picture $I_{29}$ is the newest successfully sent I picture with temporal layer id $T_0$ and stored on the server. The picture $P_{32}$ is a synchronous P picture which only refers to the Picture $I_{29}$. Since the pictures $P_{33}$, $P_{34}$ do not refer to any picture preceding the synchronous P picture $P_{32}$ in decoding order, they can be correctly decoded when the decoding is starts from the server stored I picture $I_{29}$ and the synchronous P picture $P_{32}$. The pictures $P_{28}$, $P_{30}$, $P_{31}$, which refer to the picture preceding the synchronous P picture $P_{32}$ in decoding order, cannot be correctly decoded during random access decoding. In summary, when the new attendee joins, the pictures $I_{29}$, $P_{32}$, $P_{33}$, $P_{34}$, are sent to the new attendee by server; the pictures $P_{28}$, $I_{29}$, $P_{30}$, $P_{31}$, $P_{32}$, $P_{33}$, $P_{34}$, are sent to the other old existing attendees.

5. CONTENT ANALYSIS

The content of the current picture is first analyzed. Based on the analysis, the text-graphic content and the natural image content are distinguished between each other.

A text block detection algorithm is performed on the 16×16 block. In one embodiment, each 16×16 block is classified into three categories: text-graphic block, hybrid block, and natural image block. The number of the text-graphic block is calculated. When the percentage of the detected text-graphic block is more than a predefined threshold $T_{text\text{-}graphic\_num}$ in the current picture, the current picture is classified to a text-graphic picture.

In the text-graphic sequence, the vertical scrolling motion is a unique feature brought by the mouse operation on the screen. Therefore, the scrolling motion detection between the current picture and the last played picture is adopted for a better reference picture selection and motion estimation.

Compared with the co-located block of the last played picture, the motion region of the current picture is detected. On the motion region, a line matching algorithm is utilized to acquire the scrolling motion vector. First, a colorful line, which contains more than N times ($Time_{change}$) of the neighbor color change, is selected as a baseline to avoid the mis-detection caused by the mono background of text or pdf document. Equation 1 illustrates an exemplary equation to perform line matching:

$$Time_{change} = \sum_{i=0}^{W_{region}} p_{cur}(x+i, y) \neq p_{cur}(x+i+1, y) \quad \text{(Equation 1)}$$

Where, $P_{cur}(x,y)$ describes the luma value of the pixel in the location (x,y) in the current picture. $W_{region}$ describes the width of the current motion region.

Figure 7:
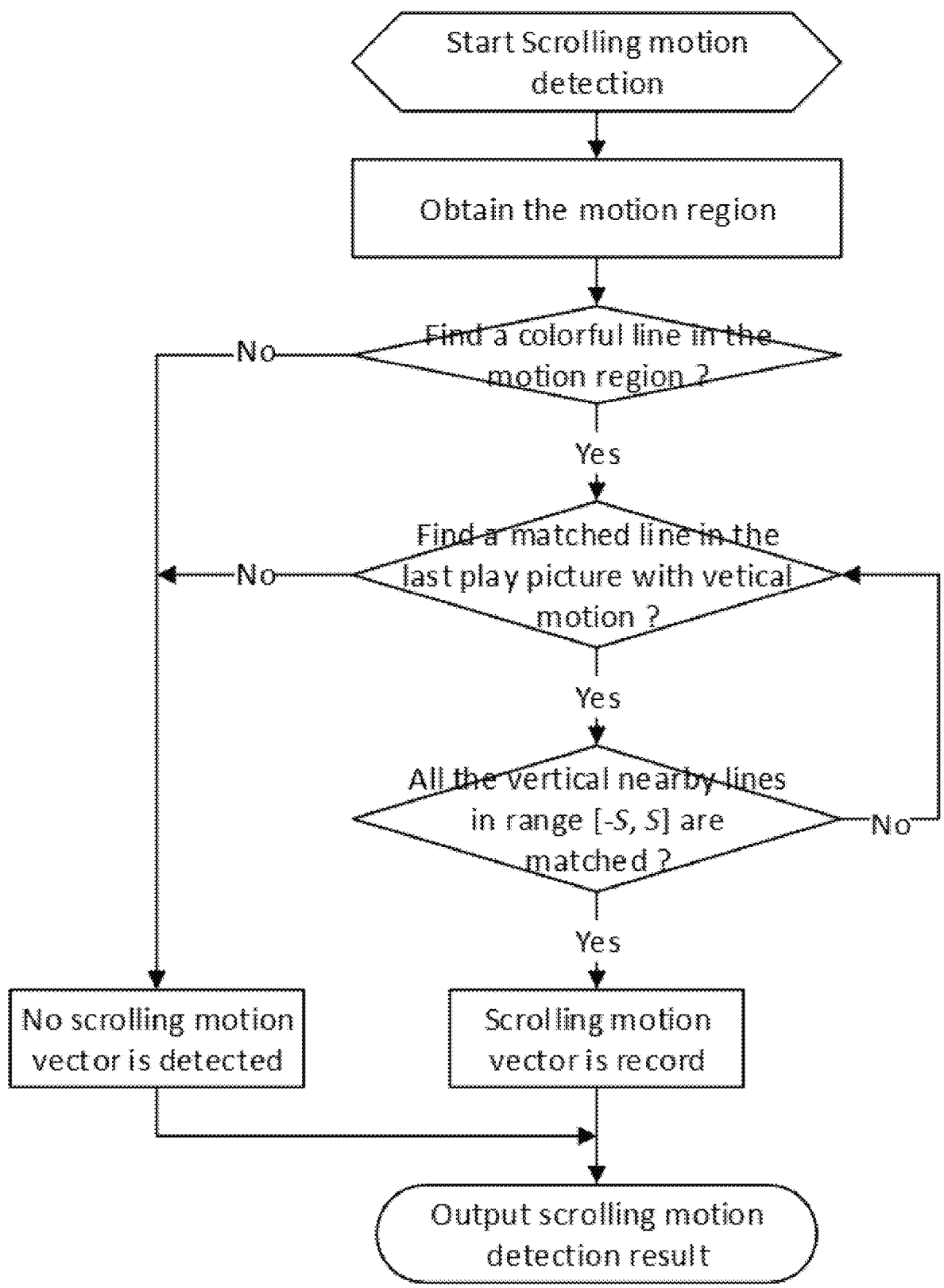
FIG. 7 illustrates a flow diagram according to an embodiment.

Then, the matching line is searched in the last played picture in the vertical direction. After the matching line is found, the vertical nearby lines in range [−S, S] are also compared to verify the scrolling motion vector. If all the nearby lines are also matched, the vertical motion vector is recorded as the scrolling motion vector $MV_{scrolling}$ of the current motion region; otherwise, try to find another matched center line. FIG. 7 shows a flowchart illustrating the scrolling motion detection.

In the natural image sequence, the continuous tone and the slow motion is usually observed. However when a scene change occurs, the temporal relationship between the current picture and the last played picture is broken. In one embodiment, a scene change detection method is applied to guide the IDR/I picture coding in the natural image sequence.

In one embodiment, a scene change detection algorithm is performed on the 8×8 block. The sum of absolute differences (SAD) value between the current 8×8 block $p_{cur}$ and the co-located 8×8 block $p_{last}$ in the last played picture is calculated in Equation 2:

$$SAD_{block} = \sum_{y=0}^{7} \sum_{x=0}^{7} |p_{cur}(x+i, y+j) - p_{last}(x+i, y+j)| \quad \text{(Equation 2)}$$

Compare $SAD_{block}$ with a predefined threshold $T_{motion}$ to pick out the high motion block in Equation 3:

$$\begin{cases} SAD_{block} > T_{motion} \Rightarrow Block_{high\_motion} \\ SAD_{block} \leq T_{motion} \Rightarrow Block_{static\_or\_low\_motion} \end{cases} \quad \text{(Equation 3)}$$

When the percentage of the detected high motion block is more than a predefined threshold $T_{motion\_num}$ in the current picture, the scene change is announced in the current picture.

6. REFERENCE SELECTION AND CODING TYPE DECISION

Considering the switching operation between the documents on the screen, the multiple reference pictures and the long term reference picture are used to provide more scenes information in the screen video coding. In one embodiment, the long term reference picture records the different scene contents.

The similarity of the scene content between the current picture and the multiple references are analyzed. Based on the analysis, the best reference pictures order, and the picture coding type, the reference type and the reference picture list are decided.

In one embodiment, the percentage of the static macro-block in the whole picture is selected as the similarity measurement standard S as shown in Equation 4.

$$S_{ref_i} = \frac{\sum_{N_{macro\text{-}block}} Macro\text{-}block_{ref_i} == static}{N_{macro\text{-}block}} \times 100\% \quad \text{(Equation 4)}$$

Calculate the SAD value between the current block and the colocated macro-block in the reference picture as shown in Equation 5:

$$SAD_{macro\text{-}block_{colocated}} = \sum_{y=0}^{15}\sum_{x=0}^{15} |p_{cur}(x+i, y+j) - p_{ref_i}(x+i, y+j)| \quad \text{(Equation 5)}$$

If the SAD value is equal to 0, the current macro-block is defined to be a static macro-block with the corresponding reference picture as shown in Equation 6:

$$\begin{cases} SAD_{macro\text{-}block_{colocated}} = 0 \Rightarrow \text{Macro-block}_{static} \\ SAD_{macro\text{-}block_{colocated}} > 0 \Rightarrow \text{Macro-block}_{non\text{-}static} \end{cases} \quad \text{(Equation 6)}$$

When more static macro-blocks are detected, the higher similarity between the corresponding reference picture and the current picture is considered. Especially, since the scrolling motion detection has been applied in the text-graphic picture, when the reference picture is the last played picture and the scrolling motion vector of the motion region is detected, the SAD value between the current block and the macro-block with scrolling motion vector in the last played picture is also calculated to detect the scrolling static macro-block as shown in Equation 7:

$$SAD_{macro\text{-}block_{scrolling}} = \sum_{y=0}^{15}\sum_{x=0}^{15} |p_{cur}(x+i, y+j) - p_{last}(x+i+MV_{scrolling_x}, y+j+MV_{scrolling_y})| \quad \text{(Equation 7)}$$

The scrolling static macro-block is considered to be a special static macro-block for it will not bring any burden in the following motion vector estimation.

According to the similarity measurement $s_{ref}$, the reference pictures set are ordered with similarity from high to low. The reference picture with the largest static macro-block percentage $s_{ref}$ is modified to the first entrance of the reference picture list to make sure more macro-blocks can be coded with SKIP mode with the fewer bits. At the same time, the rest reference pictures with the larger $s_{ref}$ are modified with the smaller reference indexes that is also help to reduce the coded bits of the reference index in each macro-block.

In one embodiment, during the similarity measurement, the total percentage $s_{cur}$ of the static macro-blocks in the current picture, which refer to the multiple reference pictures, is also obtained as shown in Equation 8:

$$S_{cur} = \frac{\sum_{i=0}^{N_{ref}}\sum_{N_{macro\text{-}block}} \text{Macro-block}_{ref_i} = static}{N_{macro\text{-}block}} \times 100\% \quad \text{(Equation 8)}$$

Combining the total percentage $s_{cur}$ with the detected content type of the current picture and the scene change detection results, the following operation is performed to select the picture coding type, the reference type and the reference picture list:

If the total percentage $s_{cur}$ is smaller than a predefined threshold $T_{new\_scene}$, the effect of multiple reference picture is limited, and the current picture seems to be a new scene picture.

Here are some scenarios:
1) When the current picture is a natural image picture and the scene change is detected, the current picture is considered to be a new scene picture. In this case, I picture coding is used and the current picture is marked as a long term reference to keep the new scene.
2) When the current picture is a natural image picture, but the scene change is not detected, the current picture is considered to be a slow motion picture. In this case, P picture coding with a single reference picture ($Ref_0$ in the ordered reference picture list) is used and the current picture is marked as a short term reference.
3) When the current picture is a text-graphic picture, the current picture is also considered to be a new scene picture. In this case, I picture coding is used and the current picture is marked as a long term reference to keep the new scene.

If the total percentage $s_{cur}$ is larger than $T_{new\_scene}$ and smaller than a predefined threshold $T_{large\_diff\_scene}$ ($T_{large\_diff\_scene} > T_{new\_scene}$), the current picture is considered to be a picture with large different scene region. In this case, the P picture coding with multiple reference picture list (all $Ref_i$ in the ordered reference picture list) is used and the current picture is marked as a long term reference to keep the large different scene.

Otherwise, the total percentage $s_{cur}$ is larger than $T_{large\_diff\_scene}$, the current picture is considered to be a picture with small scene change. In this case, the P picture coding with multiple reference picture list (all $Ref_i$ in the ordered reference picture list) is used and the current picture is marked as a short term reference.

TABLE 2

Conditions for the decision of picture coding type, reference type and reference picture list

| Conditions | Picture coding type | Reference type | Reference picture list |
| --- | --- | --- | --- |
| $s_{cur} < T_{new\_scene}$ && Natural image picture (in 1.1) && Scene change (in 1.3). | I picture | LTR | No reference |
| $s_{cur} < T_{new\_scene}$ && Natural image picture (in 1.1) && No scene change (in 1.3) | P picture | STR | Single reference, $Ref_0$ in the ordered reference picture list with the largest $p_{ref}$ |
| $s_{cur} < T_{new\_scene}$ && text-graphic picture (in 1.1) | I picture | LTR | No reference |
| $T_{new\_scene} < s_{cur} < T_{large\_diff\_scene}$ | P picture | LTR | Multiple reference, all $Ref_i$ in the ordered reference picture list |
| $s_{cur} \geq T_{large\_diff\_scene}$ | P picture | STR | Multiple reference, all $Ref_i$ in the ordered reference picture list |

Based on the similarity measurement, the largest static macro-block percentage $s_{ref}$ is analyzed. If the largest static macro-block percentage $s_{ref}$ more than a predefined threshold $T_{duplicate\_scene}$ ($T_{duplicate\_scene} > T_{large\_diff\_scene} > T_{new\_scene}$), the current picture is announced to be a duplicated picture with $Ref_0$. Considering the proposal of the multiple reference strategy—record more different scene to improve the coding efficiency, two reference pictures with a duplicated scene should not exist in the same reference picture set. Therefore, when the duplicated scene is detected, the duplicated reference picture is replaced by the current picture in the reference picture list after encoding.

7. EXAMPLE IMPLEMENTATION MECHANISM—HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
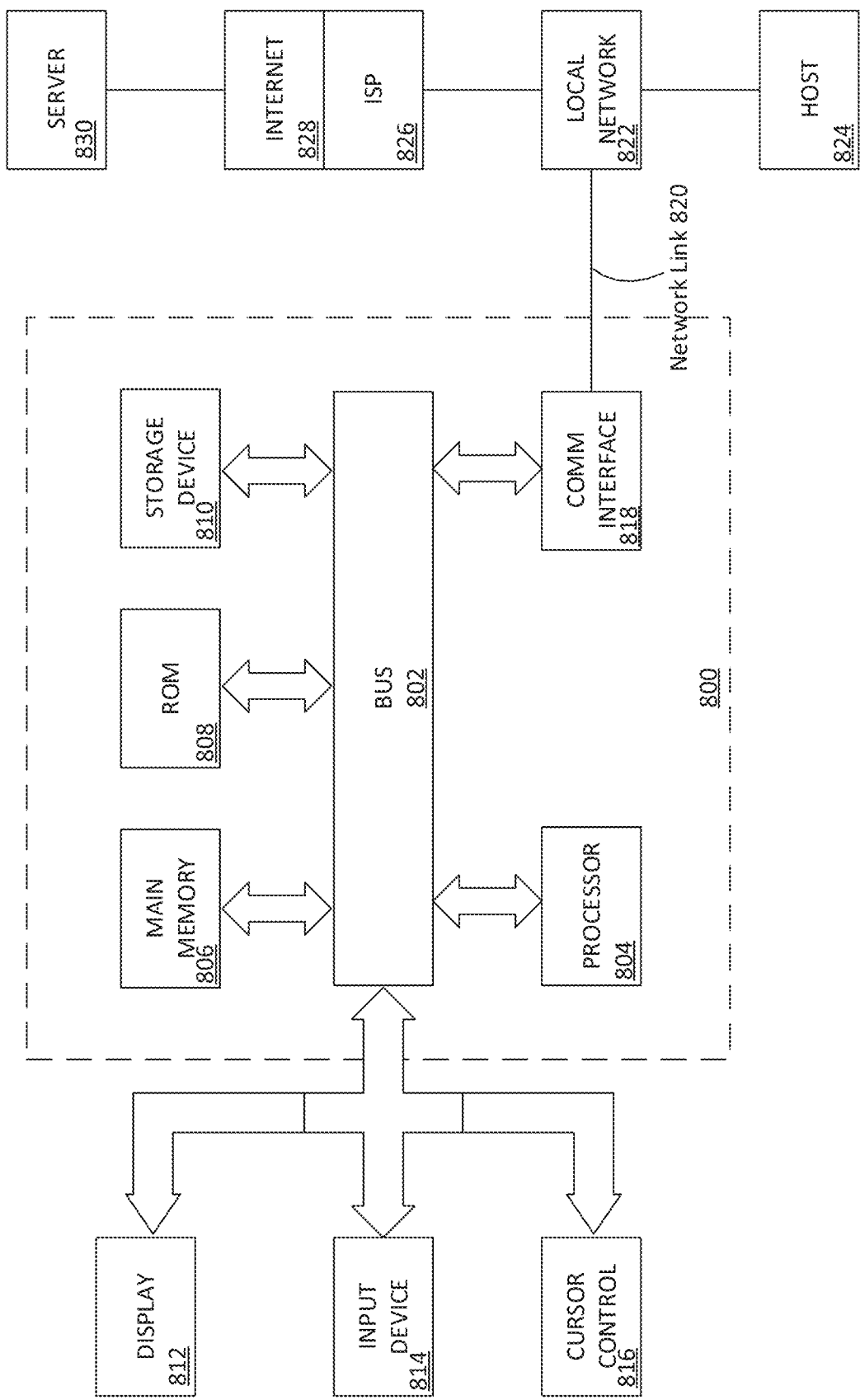
FIG. 8 illustrates a computer system with which an embodiment may be implemented.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 1002. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution. \

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. An adaptive screen encoding control method comprising:
   using a computer, creating and storing, in computer memory, a plurality of reference rules for use by a screen video encoder configured to control a plurality of bitrates;
   extending a plurality of reference rules based on a temporal scalable encoding structure to provide bit streams with different frame rates;
   coding a synchronous P picture based on a most recent I picture to support random access;
   using a plurality of long term reference pictures and a plurality of short term reference pictures in a reference picture list;
   adopting one of the plurality of long term reference pictures to record different scene contents;
   adopting the plurality of multiple long term reference pictures to provide more scenes information;
   referring to both the plurality of long term reference pictures and the plurality of short reference pictures for a current short term picture;
   referring to solely the plurality of long term reference pictures for a current long term picture;
   removing the plurality of short term reference pictures in the reference picture list for a current long term picture; and
   detecting a reference picture type including one of the plurality of long term reference pictures and one of the plurality of short term reference pictures, a picture coding type including an I picture and a P picture, associated with one of the current long term picture and the current short term picture based on a content change analysis, wherein content change analysis is based on a content type, including detecting a vertical scrolling motion within a textual content, and detecting a large motion area within a natural image content,
wherein the method is performed by one or more special-purpose computing devices.

2. The method of claim 1, further comprising selecting from a plurality of no reference, a single reference, and multiple references based on a content type, the picture coding type, and the reference picture type.

3. The method of claim 1, further comprising classifying a duplicate scene, a large different scene and a new scene corresponding to a current picture within the textual content based on a percentage of static macroblocks.

4. The method of claim 1, further comprising classifying a similarity scene and a new scene corresponding to a current picture within a natural image content based on a percentage of large motion macroblocks.

5. The method of claim 1, wherein extending the plurality of reference rules based on the temporal scalable encoding structure further comprising:
   managing the reference picture list with a temporal identifier, to include both the plurality of long term reference pictures and the plurality of short term reference pictures, for each temporal layer; and
   referring to a plurality of reference pictures with a temporal identifier that is smaller than or equal to the temporal identifier associated with a current picture.

6. The method of claim 1, further comprising retaining a most recent I picture and removing all other reference pictures, and coding the synchronous P picture which only refers to the most recent I picture.

7. The method of claim 6, further comprising storing the most recent I picture on the server.

8. The method of claim 6, further comprising sending both the most recent I picture and the synchronous P picture to a receiving client of a new attendee; and sending solely the synchronous P picture to an existing receiving client.

* * * * *